F. A. HART.
COMBINED TYPE WRITING AND COMPUTING MACHINE.
APPLICATION FILED NOV. 30, 1915.
1,176,364.
Patented Mar. 21, 1916.
7 SHEETS—SHEET 5.
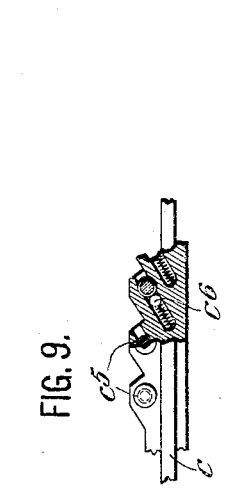
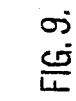
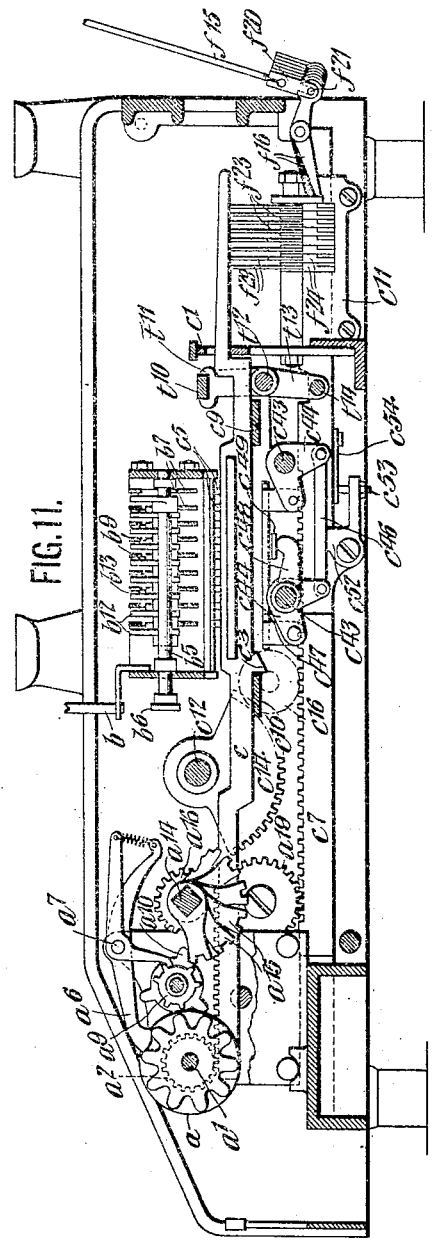
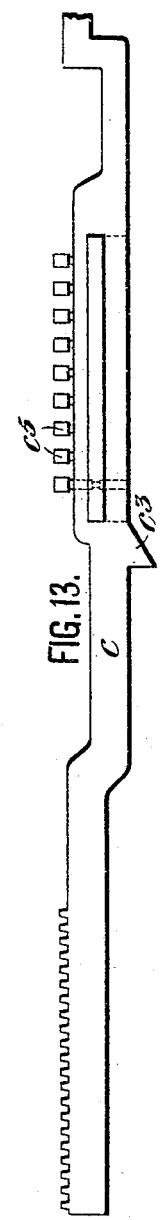
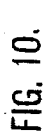
WITNESSES:
W. Westphal
Arthur A. Johnson
INVENTOR:
Frederick A. Hart
BY B. C. Stickney
ATTORNEY

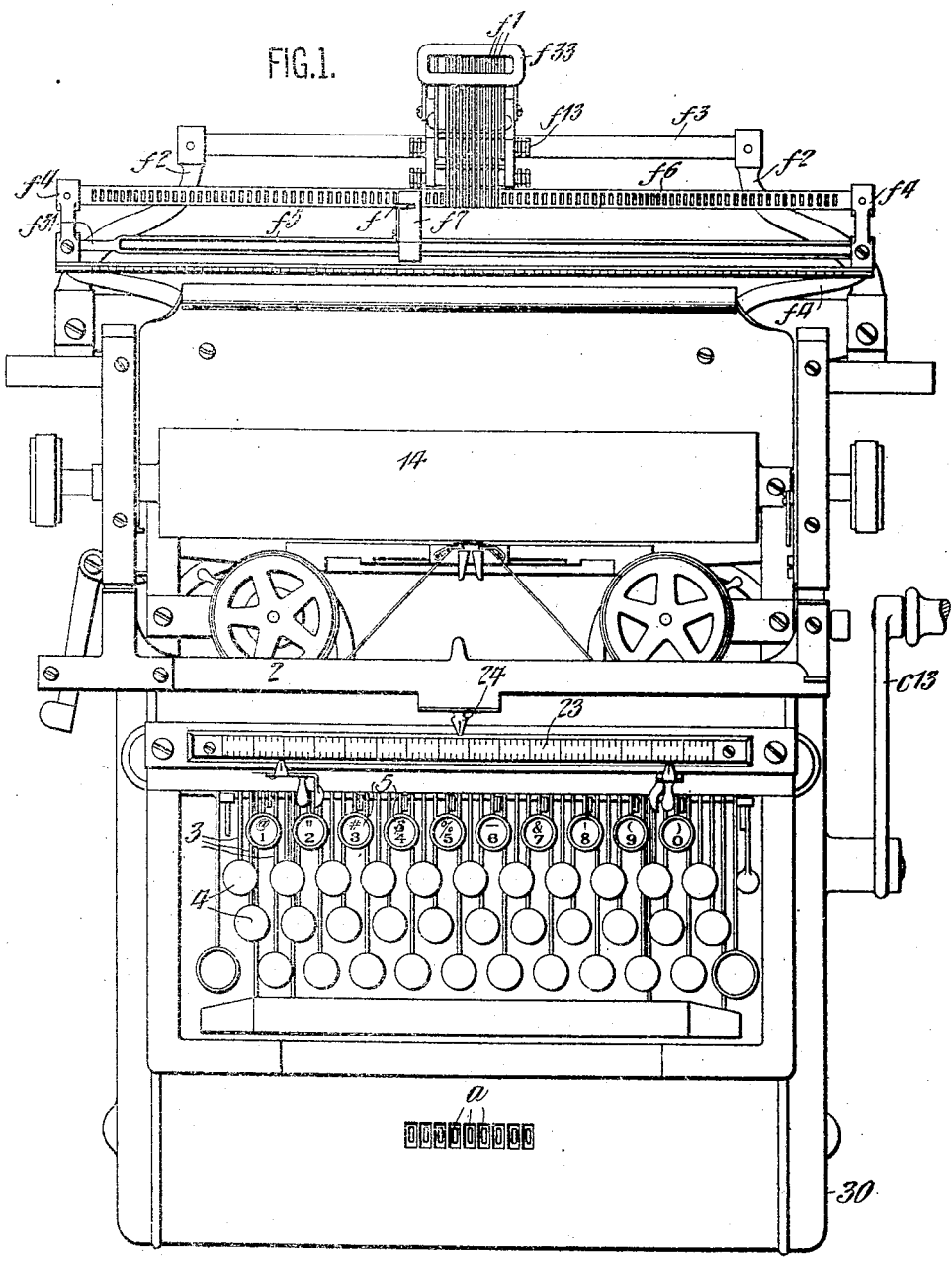

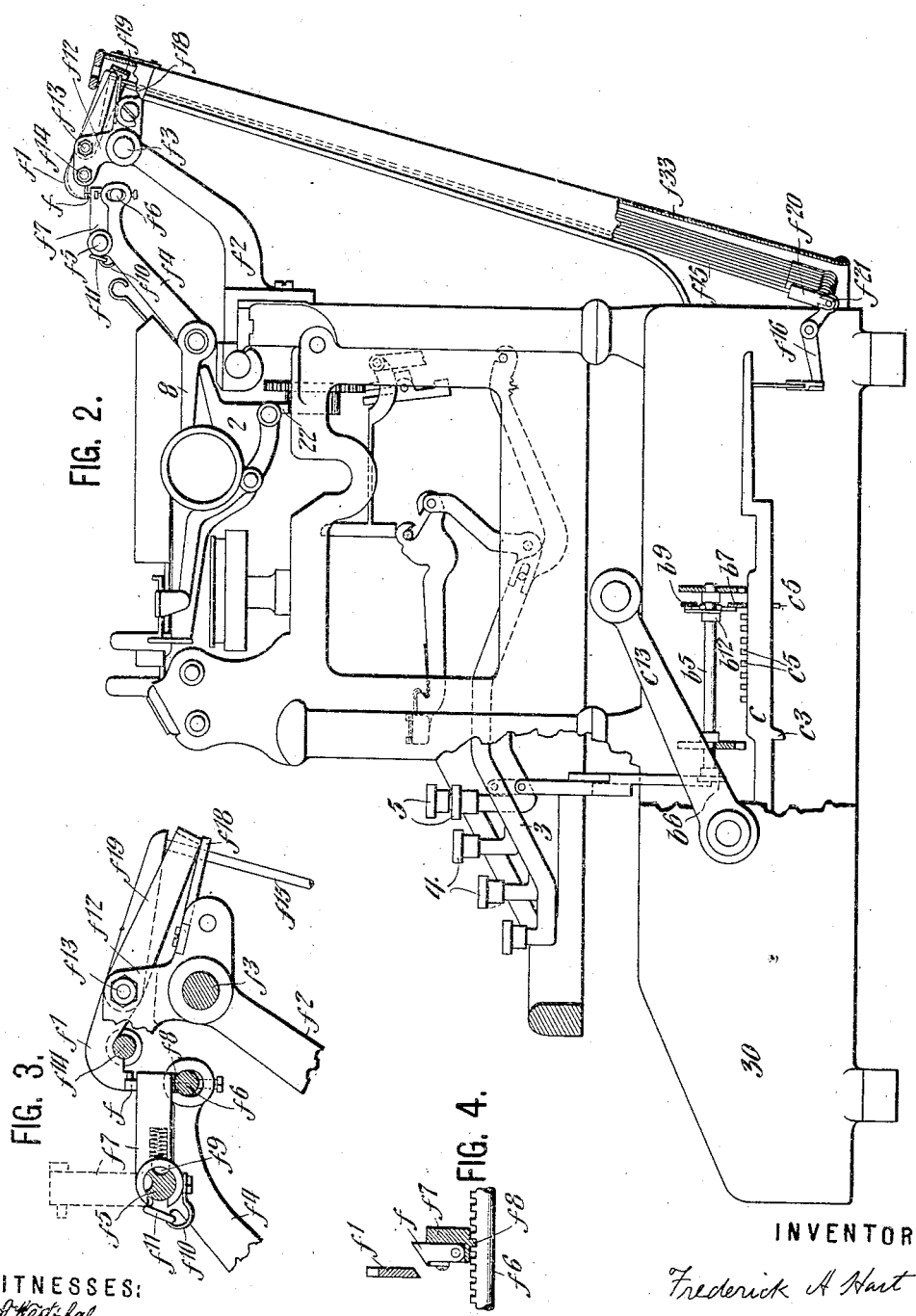

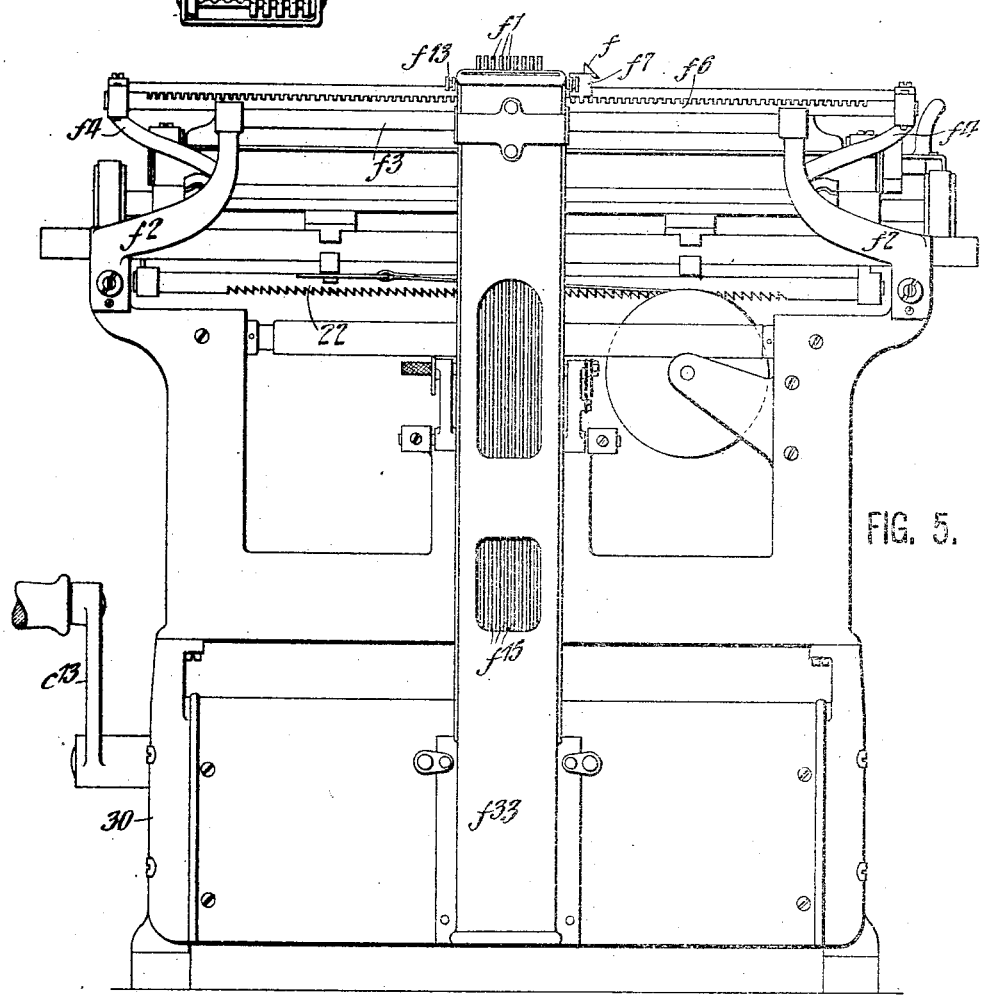

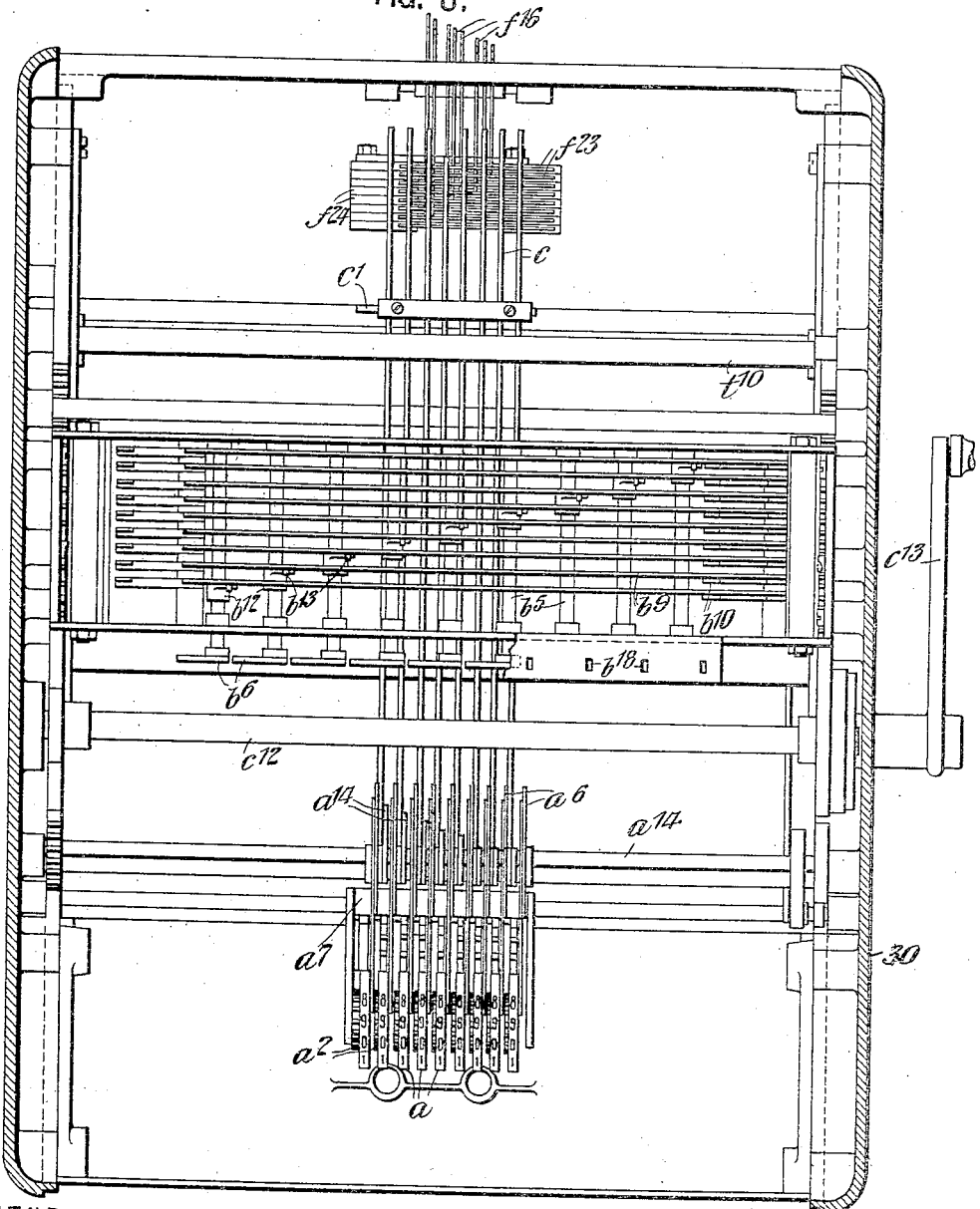

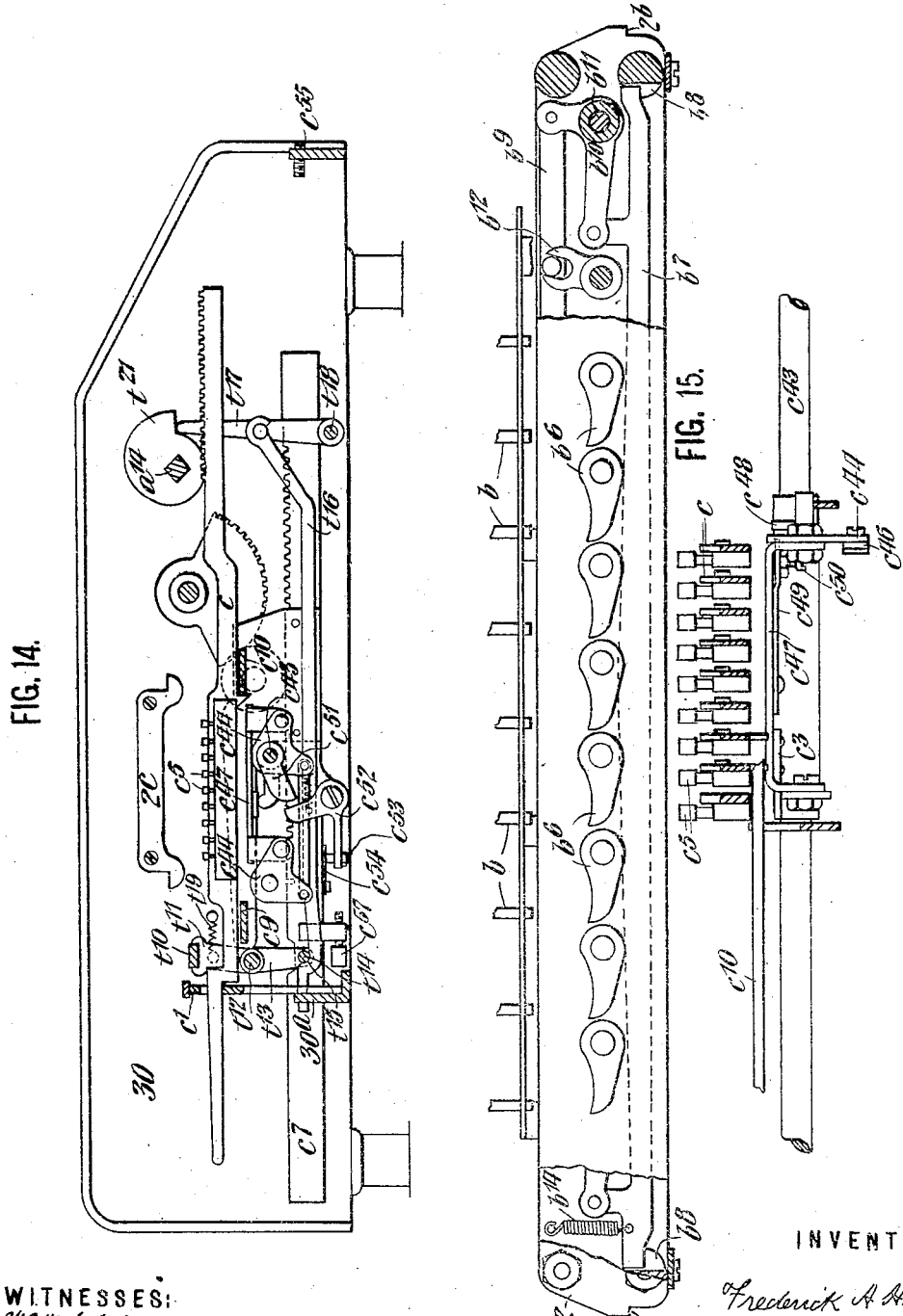

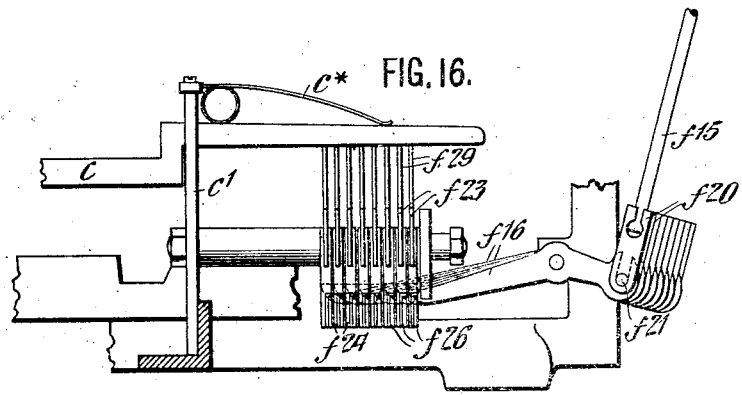
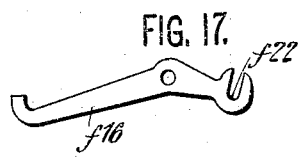
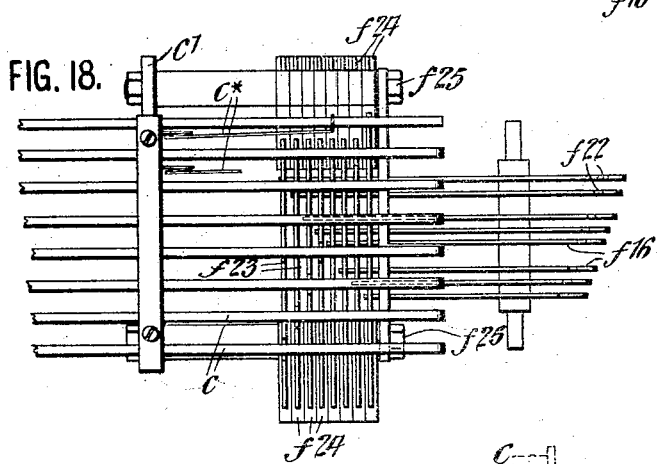
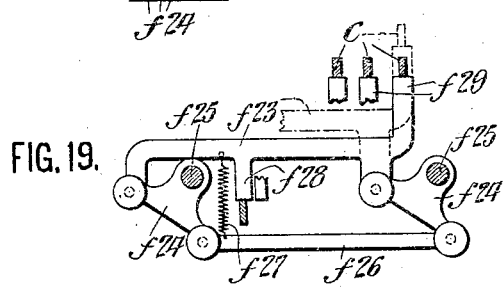

UNITED STATES PATENT OFFICE.

FREDERICK A. HART, OF NEWARK, NEW JERSEY, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,176,364.        Specification of Letters Patent.     Patented Mar. 21, 1916.

Original application filed December 10, 1908, Serial No. 466,836. Divided and application filed April 21, 1914, Serial No. 833,357. Divided and this application filed November 30, 1915. Serial No. 64,216.

*To all whom it may concern:*

Be it known that I, FREDERICK A. HART, a citizen of the United States, residing in Newark, in the county of Essex and State of New Jersey, have invented certain new and useful Improvements in Combined Type-Writing and Computing Machines, of which the following is a specification.

My invention relates to computing machines, and is herein illustrated as applied to a combined typewriting and computing machine of the general type disclosed in the United States patents to Hans Hanson, No. 816,319, dated March 27, 1906, and No. 905,421, and No. 905,422 dated December 1, 1908.

This application is a division of No. 833,357, which is a division of No. 466,836, filed December 10, 1908.

In said patents the numeral keys of the typewriter, as they are operated, set up on computation bars the digits written by said keys, and the digits thus set up and written are later carried into computing or dial wheels. Since there are only ten numeral keys on the typewriter, there is provided a separate computation bar for each of the computing wheels, and the typewriter carriage at any moment determines on what bar the numeral key then operated will set up a digit. The digit is thus set up by depressing the proper one of a set of unit or digit pins on the computation bar, and after a number has been completely set up by depressing a pin on each of several bars, the bars are driven forward by a general operator which includes a cross-bar, said cross-bar coming forward, striking the ends of the depressed pins, and driving the bars thereby each to an extent depending on the location of the depressed pin thereon. The computation bars include racks on their forward ends, and these racks serve to turn the computation wheels as above described.

According to my invention, the computation bars may be shifted to pin-setting position by a dog which is adjustably positioned at any one of a number of letter-spaces on the typewriter carriage. Said dog, as the typewriter carriage travels along, passes under and lifts one after another a series of jacks which are connected to said computation bars, in such a way that in lifting each jack, the dog will lift or shift its computation bar so as to bring the pins thereon to position within the range of pin-setting linkages operated by the numeral keys of the typewriter. Each pin-setting linkage is operated every time its numeral key is depressed, but the linkages are ineffective on the pins unless some bar is shifted or displaced to bring its pins within the range of the linkages. In this way the dog on the typewriter carriage selects the computation bar, and thereby determines into what wheel the digit printed at any letter-space will be carried.

Other features and advantages will hereinafter appear.

In the accompanying drawings, Figure 1 is a plan view of an Underwood typewriting machine showing my invention applied thereto. Fig. 2 is a side view of the same, partly in section. Fig. 3 is a detail side view showing the denomination dog on the carriage and some associated parts. Fig. 4 is a rear view of the same. Fig. 5 is a rear view of the combined machine. Figs. 6 and 7 are plan views of details of Fig. 3. Fig. 8 is a plan view of the computing mechanism. Figs. 9 and 10 are details of a pin bar. Fig. 11 is a side view showing the computing devices in section. Fig. 12 is a plan view of a pin bar. Fig. 13 is a side view of the same. Fig. 14 is a side view of the computing mechanism from the side opposite Fig. 2. Fig. 15 is a front view of some of the connections between a numeral key and its pin-setting linkage, and the pins. Fig. 16 is a side view of the computation bar selecting connections. Fig. 17 is a side view of a lever shown in Fig. 16. Fig. 18 is a plan view of Fig. 16. Fig. 19 is a rear view of a linkage shown in Fig. 18. Fig. 20 is a plan view of the tops of the linkages.

In the No. 5 Underwood typewriting machine character keys 4 and numeral keys 5 depress their key levers 3, to cause the typebars to swing upwardly and rearwardly against a platen 14 which is supported in the usual carriage 2. Said carriage includes the usual escapement rack 22 by which the carriage is fed along one letter-space at a time by the operation of the keys. As the typewriter carriage travels along, its pointer 24 shows at any moment on the scale 23 the letter-space at which the carriage is standing.

The typewriter frame is detachably mounted upon the case 30 of the computing mechanism; and said computing mechanism includes the devices on which the numbers are temporarily set up by the numeral keys, the computing wheels, and various appurtenances of these devices.

Whenever a numeral key 5 is depressed to print, it at the same time automatically operates a pin-setting linkage which may cause a pin $c^5$ to be set up on any of nine register or computation bars $c$. These bars are utilized for selecting the denomination of computations and may be regarded as decimal order bars. Said decimal order bars $c$ usually stand in the position seen in Fig. 11, in which their pins $c^5$ are clear of pin-setting linkages which include unit bars $b^7$. Said decimal order bars are, however, in a manner hereinafter described, raised one at a time into the position seen at Fig. 2, wherein one is raised so that its pins are within the range of the pin-setting bars $b^7$, with the result that when any numeral key is depressed, its pin-setting bar $b^7$ will depress a pin $c^5$ on the elevated computation bar $c$, thereby setting up the digit represented by that key on that bar. One such pin is shown as being set in Fig. 2. There are nine such pins $c^5$ on each register bar, mounted in a thickened portion of the bar and yieldingly held in position by spring-pressed balls $c^6$.

The connections for raising the decimal order bars $c$ to the position seen in Fig. 2 include a denomination-selecting dog or tappet $f$ mounted on a bracket $f^4$ on the typewriter carriage 2, and a series of levers or jacks $f^1$ under which said tappet $f$ passes. By means of its upper face which is beveled to form a cam surface, as seen in Fig. 4, the tappet engages the beveled cam ends of the jacks and raises them one after another so that each jack swings around its pivot $f^{13}$, whereby the rear end of the jack will depress its wire or rod $f^{15}$, causing the lower end of said rod to rock a lever $f^{16}$ to lift its decimal order bar $c$ to the pin-setting position seen in Fig. 2. Between the levers $f^{16}$ and the decimal order bars $c$ is a transposition device to enable the typewriter carriage, as it travels to the left, to bring the computation bars successively into pin-setting position, beginning with the left-hand bar. Such a transposition device is necessary to give this result, because the numbers on the typewriter are written first with the left-hand digit, then with the next to the right of that, and so on; and it is essential that the computations in the computing device begin on the corresponding decimal order bar at the left, and then on the next bar to the right of that, and so on, so that numbers written in any particular column will be computed in the corresponding column, and in the same order in the computing device.

The transposition device includes a series of transverse linkages at the rear of the machine, each linkage including a parallel motion device which includes an upwardly extending lug $f^{29}$ on a link $f^{23}$, there being one of such lugs underlying each of the computation bars $c$, and therefore one linkage for each of said computation bars. Each of these linkages is adapted to be operated by one of the levers $f^{16}$; said levers, as will be seen from Figs. 2, 11, and 16, are successively of greater lengths, so that the forward ends of said levers each operate only one of the linkages, each linkage being provided with a downwardly extending lug $f^{28}$, which overlies the front end of its lever $f^{16}$, and by which the lever operates the linkage. The lugs $f^{28}$ are of sufficient height so that there will be no possibility of any lever $f^{16}$ striking any other linkage in its movement upward. When the rear end of said lever is depressed by its rod $f^{15}$ when operated by the dog on its carriage, as best shown in Fig. 2, the lever $f^{16}$ will raise the bar $f^{23}$ and cause its lug $f^{29}$ to lift the computation bar to the position shown in Fig. 2.

The parallel motion device for each linkage includes a bell crank $f^{24}$ at each end of the link $f^{23}$ and attached to an arm reaching downwardly from said link, said bell cranks each being journaled on a tie-rod $f^{25}$, and said bell cranks having their other ends connected by a second link $f^{26}$. The decimal order bar raising links are normally held in their lowest position by coil springs $f^{27}$, which join the opposite links $f^{23}$ and $f^{26}$ of each parallel motion device. The computation bars $c$ pass through a comb $c^1$ at their rear ends, and are held down by flat springs $c^*$ so that they normally rest on, or are adjacent to the lugs $f^{29}$. These springs yield when the bars $c$ are raised by their linkages $f^{29}$, and the teeth of the comb are long enough to permit such raising.

The keys 5 operate their pin-setting linkages $b^7$ by means of stems or push rods $b$, each of which, as its key descends, will strike its rock arm $b^6$ on the forward end of a linkage-operating rock shaft $b^5$. These rock shafts $b^5$ are each provided with a rock arm $b^{12}$ fast thereon, said rock arm ending in a fork which engages a wrist $b^{13}$ on a link $b^9$ forming part of a parallel motion device for its pin-setting linkage $b^7$.

As the key stem $b$ rocks its rock shaft $b^5$, it swings the link $b^9$ to the left so as to rock a bell crank $b^{10}$ at each end thereof, said bell cranks also carrying the pin-setting or unit bar $b^7$, and the form of the bell crank is such that the short vertical arms thereof move the link $b^9$ almost horizontally, while the long horizontal arms thereof swing the pin-setting bar $b^7$ nearly vertically.

The system of linkages including the bell cranks $b^{10}$, links $b^9$ and bars $b^7$ are assembled in a frame $b^2$, on rods $b^{11}$, on which the bell cranks $b^{10}$ are mounted, and said frame also includes tie-rods into which slots $b^8$ are cut, forming guides for the pin-setting bars $b^7$. The frame $b^2$ is mounted on the case 30, and said frame $b^2$ comprises bars which are notched at $2^b$ (Fig. 15) for engagement with the depressed ends of supporting strips $2^c$ rigidly secured on the inside of the case 30. The pin-setting or unit bars $b^7$ are held in their normal elevated position clear of the pins $c^5$ by coil springs $b^{14}$ which are anchored in the frame $b^2$.

With the construction described, it is evident that the depression of one of the numeral keys will result in the depression of the corresponding pin-setting or unit bar $b^7$. It will also be noted, particularly by reference to Fig. 15, that a very considerable portion of the downward movement of the depressed numeral key takes place before the key brings its push bar $b$ into engagement with the corresponding rock arm $b^6$. It will also be noted that the upper arms of the bell cranks $b^{10}$ are very short as compared with the lower arms thereof, so that a very small portion of the final downward movement of a numeral key is required to effect a considerable downward movement of the corresponding pin-setting bar.

One special object of this invention is to provide for a very light touch and for the possibility of operating the numeral keys in very rapid sequence. This is obtained by having the numeral keys operate in the manner described, which enables the momentum gathered by a type-bar in the early part of its stroke to do practically all of the work of operating its pin-setting bar $b^7$. The bars $b$ at their lower ends are guided in openings $b^{18}$ in a plate formed by a forwardly projecting flange on the frame $b^2$.

When a number has been written and has been set up on the decimal order bars $c$, it is carried by a general operator into the digit-bearing computing wheels $a$ at the front of the machine, which wheels are supported on a cross shaft $a^1$ having bearings (rising from the bottom of the computer case 30). For driving its wheel, each decimal order bar $c$ has at its forward end, formed integrally therewith, a rack comprising teeth which mesh with the pinion $a^2$ on its computing wheel $a$. The decimal order bars $c$ have their racks constantly in mesh with the pinions $a^2$, with the result that when the general operator moves forward, a cross bar $c^9$, forming part of said general operator, will strike the projecting ends of any depressed pins $c^5$ and drive the computation bars thereby, so that each bar turns its pinion to an extent depending on the location of the pin depressed. Said general operator forms an operating carriage which includes side bars $c^7$ and a cross bar $c^{10}$, which form a rigid frame, which is manually driven by a handle $c^{13}$ at the right of the machine. For driving the general operator from this handle, the handle is fast to a shaft $c^{12}$ extending across the machine and provided at each end with a toothed segment $c^{14}$. Said segments mesh with idle pinions $c^{16}$, which pinions in turn mesh with racks cut in the side bars $c^7$ of the general operator. To drive the general operator, the handle $c^{13}$ is pulled forward, thus driving the general operator forward, and causing said general operator to pick up the computation bars $c$, one after another, through depressed pins $c^5$. The general operator slides in guide bearings $c^{11}$ on the sides of the case 30 and is arrested at the end of its forward stroke by stops in the form of set screws $c^{55}$. To return the general operator, the handle $c^{12}$ is moved rearwardly, and the cross bar $c^{10}$ of the general operator engages lugs $c^3$ on the forward ends of the computation bars, and pushes said bars rearwardly. On this return movement, the pinions $a^2$ turn idly on the computing wheels $a$ because of one-way clutches, not shown, between the computing wheels $a$ and their pinions $a^2$.

At the very end of the return stroke of the general operator, the set pins $c^5$ are all unset or returned to normal position. For this purpose there is provided under the pins where they normally stand, a restoring plate $c^{47}$ which is raised against the under side of the computation members $c$ at the end of the return stroke of the general operator, thus lifting the pins $c^5$ to their normal position. For accomplishing this, the general operator is provided with a spring-held cam-acting dog $c^{52}$, which, on the return stroke of the general operator, rides under and lifts an arm $c^{51}$, fast on a rock shaft $c^{43}$ which forms part of a parallel motion device for the pin-restoring plate $c^{47}$. During the forward stroke of the general operator, this dog $c^{52}$ is swung idly out of the way against the tension of its spring. On the return stroke of the general operator, however, the cam face of the dog $c^{52}$ momentarily lifts the arm $c^{51}$, thereby momentarily lifting the platform $c^{47}$. To allow for this motion, the dog $c^{52}$ is pivoted on an extension of the bar $c^7$ of the general operator, and includes an arm comprising a stop $c^{53}$ which is normally drawn by the spring of the dog against a stop clip $c^{54}$ fast to the bottom of the general operator. The pin-restoring plate $c^{47}$ is pivoted on rock arms forming part of a parallel motion device which includes two parallel shafts $c^{43}$, each having rock arms thereon, to which arms depending lugs of the plate $c^{47}$ are connected, and the front and back portions of the rock arms $c^{44}$ are joined by idle links $c^{46}$. The platform $c^{47}$ is raised by an arm $c^{48}$ fast on the shaft $c^{43}$ and bearing against a projecting arm $c^{49}$ on the platform $c^{47}$. This arm $c^{49}$, as shown in Figs. 14 and 15, is riveted at its inner end to the central portion of the platform $c^{47}$, and its free end is made adjustable relatively thereto by a set screw $c^{50}$.

In order to prevent the computation bars $c$ from rising when the pin-restoring plate $c^{47}$ is raised, the mechanism includes a holding bar $t^{10}$ which is swung over shoulders on the rear ends of the computation bars at the moment the pin-restoring plate $c^{47}$ is operated. This bar $t^{10}$ is moved to its effective position by connections which will be described later. The general operator itself is arrested at the end of its rearward stroke by a stop $c^{57}$ on the case 30, said stop being located in the path of a set screw adjustably mounted on a side bar $c^{7}$ of the general operator.

When a number has been carried into the computing wheels and then another number is added thereto, it is necessary, if any wheel turns from reading "9" to reading "0", to provide that the adjoining wheel to the left will be advanced one unit space, thus making a carry-over, as is ordinarily done mentally in addition. To accomplish this the machine is provided with carry-over devices of the general type shown in the aforesaid Hanson patents. Each computing wheel is provided with a single carry-over tooth, which, when the computing wheel turns from "9" to "0", will give an adjacent carry-over pinion a slight turn, and said pinion, on the return stroke of the general operator, is turned to a considerable extent farther, with the result that it turns the adjacent computing wheel one unit space, thereby completing the carry-over, as particularly described in patent to Hanson, No. 816,319, in connection with Figs. 42, 43, 44 of said patent. The computing wheels are provided with spring detents $a^{6}$ mounted on a transverse rod $a^{7}$, and the carry-over pinions are provided with similar detents which may have for springs, the springs used for the detents $a^{7}$.

When a carry-over pinion has been set on the forward stroke of the general operator by a computing wheel $a$, it brings its six-toothed wheel $a^{9}$ into the position described in the said Hanson Patent No. 816,319, where its toothed driver $a^{15}$ will drive it on the return stroke of the general operator, and in so being driven, the three-toothed pinion $a^{10}$ will turn the adjacent computing wheel $a$ one unit space. There is a driver $e^{15}$ for each carry-over wheel and they are spirally mounted on a shaft $a^{14}$ extending across the machine, and said shaft is driven by a pinion meshing with the side rack of the general operator, said pinion meshing with a pinion $a^{16}$ which is on the driving shaft $a^{14}$, but is connected thereto by a one-way clutch, in such a manner that the shaft $a^{14}$ stands idle on the forward stroke of the general operator, but is rotated on the return stroke thereof.

In order to hold the computation bars against rising when the pin-restoring platform rises, a bar $t^{10}$, as has been stated, is caused to be moved backward over the rear raised ends of the computation bars, and this movement is effected by the carry-over drive shaft $a^{14}$. The connections for accomplishing this include the cam plate $t^{21}$ fast on said shaft $a^{14}$, which coöperates with the follower $t^{17}$, said follower normally lying against the innermost portion of said cam. During the return stroke of the general operator, said follower $t^{17}$ is drawn forward so as to move the holding bar $t^{10}$ backward, and for this purpose the cam $t^{21}$ has a snail front having an abrupt end just beyond which the follower $t^{17}$ normally rests. Said follower $t^{17}$ is carried on a shaft $t^{18}$ and is connected to operate the holding bar $t^{10}$ by a link $t^{16}$, the rear end of which has a shoulder $t^{15}$ catching behind a transverse bar $t^{14}$, which is carried on depending arms $t^{13}$ of a rock shaft $t^{12}$, said rock shaft carrying the holding bar $t^{10}$ by upstanding arms $t^{11}$. Said holding bar $t^{10}$ is normally held clear of the computation bars $c$ by a light spring $t^{19}$ which draws it forward. The link $t^{16}$ is guided in an angle bar $30^{a}$ of the casing 30.

The denomination-selecting dog $f$ is pivoted on a block or carrier $f^{7}$, so that on returning of the typewriter carriage to begin a new line, said dog may swing backward on its pivot and pass the jacks $f^{1}$ easily. Said dog is spring-held, so that it normally stands in its effective position. The carrier or block on which the dog $f$ is mounted is itself pivotally mounted on a rod $f^{5}$ in front of the place normally occupied by the dog $f$ so that the carrier may be swung upward around the rod $f^{5}$ in front and out of the way of the jacks $f^{1}$, as shown in dotted lines at Fig. 3. This rod $f^{5}$ is carried on brackets $f^{4}$ on the typewriter carriage, and the carrier $f^{7}$ detained on said rod in either its effective or ineffective position by a spring-pressed detent $f^{9}$ which engages one of two grooves in said rods. When the carrier $f^{7}$ is swung down to hold the dog $f$ so that it will pass under the jacks $f^{1}$, the carrier $f^{7}$ rests on a supporting bar $f^{6}$ carried on said brackets, and a tooth $f^{8}$ on the carrier engages with teeth or notches on said supporting bar $f^{6}$, thus holding the carrier against slipping as the typewriter carriage feeds along, and carries the dog past the jacks $f^1$. These notches are set at letter-space intervals and are so located, that when the typewriter carriage is at rest, the dog $f$ will stand under one of the jacks $f^1$, and hold it elevated. To facilitate correct adjusting of the dog $f$ at the desired letter-space in the travel of the carriage, there is provided adjacent the rod $f^5$ a scale plate $f^{11}$, which coöperates with a pointer $f^{10}$ fast on the carrier $f^7$, said pointer curved under the rod $f^5$ and overlying the scale. Said scale is graduated to correspond with the scale 23 at the front of the typewriter carriage. The carrier $f^7$ with its dog $f$ can be removed from the bar $f^5$ by slipping the carrier to the reduced end $f^{31}$ of said bar and lifting the carrier therefrom.

The jacks $f^1$ are carried in a frame supported on a pair of rearwardly and upwardly extending laterally-spaced arms $f^2$ which are attached to the typewriter frame and rigidly support a transverse rod $f^3$. The levers or jacks $f^1$ are journaled on a transverse rod $f^{13}$ mounted on plates $f^{12}$ carried by the rod $f^3$, and the jacks normally rest on a rod $f^{14}$ extending between said plates $f^{12}$. The rod $f^{14}$ is preferably notched to aid in spacing the index or jacks which are also spaced by suitable collars or washers on the rod $f^{13}$. The rods $f^{13}$ and $f^{14}$ are adjustable to correctly locate the jacks $f^1$ with respect to the denomination dog $f$. The rods $f^{15}$ are detachably supported in a notched guide plate $f^{18}$, against which they are held by a coöperating bail $f^{19}$, said bail being journaled on the rod $f^{13}$. The casing $f^{33}$ extends from the plate $f^{12}$ to the computer case to protect the rods $f^{15}$ and said rods are connected to their levers $f^{16}$ by means of coupling heads $f^{20}$, which are split and provided with threaded seats into which the lower ends of the rods are screwed, and by which the rods are frictionally held against accidental rotation. The lower ends of said coupling heads are bifurcated so that they straddle the rear ends of said levers, and they are provided with pins $f^{21}$ that loosely rest in notches or open seats $f^{22}$ formed in the rear ends of levers $f^{16}$.

Normally the bail $f^{19}$ rests on the plate $f^{18}$, and holds the rods $f^{15}$ in place against said plate. When, however, the bail is swung up, the rods may be removed and lifted out of the open seats $f^{22}$ on the levers $f^{16}$.

It will be noted that in the operation of the machine, the keys will, in the adding zone, coöperate with the traveling paper carriage and index or set up a preliminary representation of a number on the denomination bars $c$, and later that the numbers thus set up are carried into the adding or computing wheels by a general operator or operating carriage. It will also be noted that the way numbers are set up is determined by the selecting device in the shape of the denomination dog $f$, on the traveling carriage, which selects the decimal orders. The carriage, of course, disconnects itself from the group of denominational trains by the act of passing out of the computing zone.

Variations may be resorted to within the scope of the invention, and portions of the improvements may be used without others.

Having thus described my invention, I claim:

1. In a combined typewriting and computing machine, the combination with a traveling carriage and computing wheels, of a single set of numeral keys adapted to letter-space said carriage, a transposing device between said carriage and said wheels, a denomination selector for operating said transposing device, a series of parallel motion linkages forming part of said transposing device, a lug on each linkage corresponding to the computing wheel which it controls, and a lug on each linkage corresponding to the letter-space in which said selector is effective thereon.

2. In a combined typewriting and computing machine, the combination with a single set of numeral keys and a traveling carriage adapted to be letter-spaced by said keys, of a denomination selector on said carriage, a series of levers on which said denomination selector is effective, a series of computation members substantially parallel to said levers, a series of transposing linkages extending transversely of said levers and said members, a lug on each linkage coöperating with one lever, and a lug on each linkage coöperating with one computation member.

3. In a combined typewriting and computing machine, the combination with a single set of numeral keys and a traveling carriage adapted to be letter-spaced by said keys, of a denomination selector on said carriage, a series of computation members, a series of levers on which said denomination selector is effective, a series of parallel motion linkages extending transversely of said levers and members, a bar forming part of each linkage, a lug on each bar overlying one of said levers, a lug on each bar underlying one of said members, and a spring for each linkage holding down its bar.

4. In a combined typewriting and computing machine, the combination with a single set of numeral keys and a traveling carriage adapted to be letter-spaced by said keys, of a denomination selector on said carriage, computation members, a series of levers on which said denomination selector is effective, and a set of single members, each connecting one lever to one bar and so constructed and arranged as to cause the bars beginning with the left-hand one to be operated by the levers beginning with the right-hand one.

5. In a combined typewriting and computing machine, the combination with a traveling carriage, of a denomination selector on said carriage, a series of pivoted levers adapted to be successively engaged and moved by said selector, a series of bars moved by the levers, a plate adjacent said levers, comprising guides for said bars, and a pivoted bail adapted to be swung over said bars and hold them against said plate.

6. In a combined typewriting and computing machine, the combination with a single set of numeral keys and a traveling carriage adapted to be letter-spaced by said keys, of a denomination selector carried by said carriage, a series of levers adjacent said carriage adapted to be moved by said selector, a rod underlying each lever, and means for detachably holding said rods beneath their levers.

7. In a combined typewriting and computing machine, the combination with a register having decimal orders, of key-actuated preliminary representation devices, a traveling paper-supporting carriage, a series of levers adjacent said carriage, and a selector settable along said carriage adapted to engage said levers *seriatim* to move them.

8. In a combined typewriting and computing machine, the combination with numeral keys and computing wheels, of a denomination-selecting dog adjustable on the typewriter carriage, a rod along which it is adjustable, an extension of said selector embracing said rod to hold it thereon, a series of denomination-controlling means engageable *seriatim* by said selector and mounted on the machine frame, and means forming part of said rod adapted to permit the selector to be withdrawn therefrom.

9. In a combined typewriting and computing machine, the combination with numeral keys and computing wheels, of a typewriter carriage, a denomination-selecting dog adjustable on said carriage, a rod along which it is adjustable, an extension of said selector embracing said rod to hold it thereon, a rack bar adapted to be engaged by said selector, a tooth on the selector for so engaging the rack bar, and a series of denomination-controlling means engageable *seriatim* by said selector and mounted on the machine frame.

10. In a combined typewriter and computing machine, the combination with a register having decimal orders, of key-actuated preliminary representation devices, a traveling typewriter carriage, decimal order selecting means including a selector carried by said traveling carriage and arranged to select the decimal orders, and means to enable said carriage to cause said selector to select said preliminary representation devices.

11. In a combined typewriter and computing machine, the combination with a register having decimal orders, of preliminary representation devices, a traveling typewriter carriage, selecting means including a selector carried by said traveling carriage, for selecting the decimal orders, and connections between said selecting means and said preliminary representation devices, for transmitting the movement of said carriage through said selecting means to said preliminary representation devices.

12. In a combined typewriter and computing machine, the combination with a register having decimal orders, of key-actuated preliminary representation devices, a traveling typewriter carriage, a decimal order selecting device carried by said carriage and adjustable to different operative positions and arranged to select the decimal orders, and means to enable the movement of said carriage to cause said selecting device to select said preliminary representation devices.

13. In a combined typewriter and computing machine, the combination with a register having decimal orders, of preliminary representation devices arranged for corresponding decimal orders, a traveling typewriter carriage, a decimal order selecting mechanism including a selector carried by said traveling carriage, for selecting the decimal orders, and connections between said selecting mechanism and said preliminary representation devices for transmitting the selective action of the former to the latter and for enabling said carriage to set said preliminary representation devices, the said selecting devices being adjustable on the said carriage, for selective action during any desired portion of the operative movement of said carriage.

14. In combination, a register, preliminary representation devices, keys with connections for setting said preliminary representation devices, and a decimal order selecting mechanism, comprising a selecting dog, and a multiplicity of independently movable selecting levers acted upon in succession by said selecting dog, under the control of said keys, and having connections operating to present the decimal orders of said preliminary representation devices, successively, to the action of the said key controlled setting connections.

15. In combination, a register, preliminary representation devices having decimal orders, key controlled means for setting said preliminary representation devices, and a decimal order selecting mechanism, comprising a traveling selecting dog, and a multiplicity of selecting levers subject to said dog and having connections for presenting the decimal orders of said preliminary representation devices, successively, to the action of said setting mechanism.

16. In combination, a register, preliminary representation devices having decimal orders, decimal order selecting mechanism, comprising a selecting dog and coöperative selecting levers, and transposing means subject to said levers, for selecting the decimal orders of said preliminary representation devices, successively from left toward the right, under movement of said selecting dog from right toward the left.

17. In combination, a register, preliminary representation devices, a key actuated setting mechanism for said preliminary representation devices, and a decimal order selecting mechanism for said preliminary representation devices, comprising a traveling selecting dog, a multiplicity of selecting levers subject to said selecting dog, transposing means subject to said levers and operative to present the decimal orders of said preliminary representation devices successively, from left toward the right, to the action of said key actuated setting mechanism, under movement of said selecting dog, from right toward the left.

18. In a combined typewriter and computing machine, the combination with typewriting mechanism, including a key controlled traveling carriage, of a register, key set preliminary representation devices for action on said register, and a decimal order selecting mechanism for said preliminary representation devices, comprising a selecting dog, a group of independently movable selecting levers, subject to said selecting dog, the said levers of said selecting mechanism operating by movement of said key controlled carriage to present the decimal orders of said preliminary representation devices in succession to the action of the key controlled setting means.

19. In a combined typewriter and computing machine, the combination with typewriting mechanism including a key controlled traveling carriage, of a register, register bars, unit pins on each bar, constituting preliminary representation devices, key actuated unit bars for setting said unit pins, and a decimal order selecting mechanism, comprising a selecting dog, a multiplicity of independently movable selecting levers, subject to said selecting dog, and a multiplicity of transposing bars subject to said levers and operating on said register bars, the said parts of said selecting mechanism operating by movement of said key controlled carriage, from right toward the left, to present the unit pins of said register bars to said unit bars, in succession, from the left toward the right.

20. In a combined typewriter and computing machine, the combination with typewriting mechanism including a key controlled traveling carriage, of a register, register bars, unit pins on each bar, constituting preliminary representation devices, key actuated unit bars for setting said unit pins, and a decimal order selecting mechanism comprising a selecting dog on said key controlled carriage, a multiplicity of selecting levers arranged to be moved in succession from the right toward the left by said selecting dog, and a group of transposing bars, subject to said selecting levers, and operative on said register bars, successively from left toward the right, to present the pins of said register bars to the action of said key controlled unit bars.

21. In a combined typewriter and computing machine, the combination with typewriting mechanism including a key controlled traveling carriage, of a register, register bars, unit pins on each bar, constituting preliminary representation devices, key actuated unit bars for setting said unit pins, and a decimal order selecting mechanism, comprising a selecting dog on said key controlled carriage, an upper set of selecting levers arranged to be engaged in succession, from right toward the left, by said selecting dog, a lower set of selecting levers, connections between the corresponding upper and lower levers, and a group of transposing bars subject to said lower selecting levers, and arranged to lift said register bars successively from the left toward the right, under a movement of said selecting dog from right toward the left.

22. In a combined typewriter and computing machine, the combination with typewriting mechanism, including a key controlled traveling carriage, a register, register bars, unit pins on each bar, constituting preliminary representation devices, key actuated unit bars for setting said pins, and a decimal order selecting mechanism, comprising a selecting dog on said key controlled carriage, a multiplicity of upper selecting levers arranged to be engaged in succession from right toward the left, by said selecting dog, a lower set of selecting levers, connections between corresponding upper and lower selecting levers, a group of transposing bars connected for parallel movements, arranged to be raised in succession by said lower selecting levers and provided with obliquely alined register bar lifting lugs, arranged to lift said register bars in succession, from the left toward the right, under movement of said selecting dog and carriage, from the right toward the left.

23. In a combined typewriter and computing machine, the combination with a register having decimal orders, of a traveling typewriter carriage, a decimal order selector connected with said carriage, means to enable said selector to actuate said register during the carriage movements, means for rendering the selector inoperative during reverse movements of the carriage, and means for rendering said selector inoperative at will during its travel in either direction.

24. In a computer, the combination with preliminary representation devices, of a traveling key-controlled carriage having means for selecting and actuating the decimal orders of said preliminary representation devices during the advance of the carriage, said selecting means being inoperative on the preliminary representation devices during the return of the carriage.

25. In a computer, the combination with a register having decimal orders, of preliminary representation devices for actuating said register, a traveling carriage, a decimal order selector carried by said traveling carriage, means to enable said selector to select and actuate said preliminary representation devices during the carriage movements, and means for adjusting the selector to different operative positions.

26. In a computer, the combination with a traveling key-controlled carriage, of a register, indexing or preliminary representation devices for actuating said register, key-controlled means for setting said preliminary representation devices, a decimal order selecting mechanism for presenting the decimal orders of said preliminary representation devices, successively to said setting means, and including a selector carried by said carriage, means for enabling said selector to actuate the preliminary representation devices during the carriage movements, and means for breaking the operative connection between the said decimal order selector and said preliminary representation devices at will.

27. The combination with a key-controlled typewriter carriage, of a selector-dog on said carriage, a set of jacks movable by said selector-dog during the advance of the carriage, a set of digit wheels, and transposed trains of mechanism extending from said digit wheels to said jacks.

28. In a combined typewriter and computing machine, the combination with a register having decimal orders, of a traveling carriage, a decimal order selector carried by said carriage, preliminary representation devices, connections between said decimal order selector and said preliminary representation devices for transmitting the selective action of the decimal order selector to the preliminary representation devices, and means for rendering the said selector inoperative on its coöperative devices.

29. In a combined typewriter and computing machine, the combination with a register having decimal orders, of a traveling carriage, a decimal order selector carried by said carriage, preliminary representation devices, connections for transmitting the selective action of the decimal order selector to said preliminary representation devices, and means for breaking said connections, at will.

30. In a computing machine, the combination with a register, and preliminary representation devices, for actuating said register, of a restoring plate for simultaneously restoring to normal positions, set numbers of said preliminary representation devices, which restoring plate is adjustable so that it may be accurately set for action on said preliminary representation devices.

31. In a computing machine, the combination with a register, register bars, unit pins on said bars and key actuated unit bars for setting said unit pins, of an adjustable pin restoring device, comprising a movable platform, a vibratory member, a pivoted cam dog on said vibratory member, operative, under one direction of movement, on a part connected to said platform, to cause said platform to restore set unit pins to normal positions, and an adjustable stop for varying the action of said cam dog.

32. In a computing machine, the combination with a register, key set preliminary representation devices, and an operating carriage for rendering the set member of said preliminary representation devices operative on said register, of a restoring device, comprising a movable platform, engageable with the set members of said preliminary representation devices, to restore the same to normal positions, a pivoted cam dog on said carriage operative on a part connected to said platform, under return movement of said carriage, and an adjustable stop for varying the action of said cam dog.

33. In a computing machine, the combination with a register, register bars, unit pins on each register bar, key actuated means for setting said unit pins, and an operating carriage operative on the set unit pins, of a unit pin restoring device, comprising a pivoted platform having a shaft with an arm thereon, a spring held pivoted cam dog on said carriage, operative on said arm, under return movement of said carriage, and an adjustable stop for varying the action of said cam dog.

34. In a combined typewriter and computing machine, the combination with a register having decimal orders, of key actuated preliminary representation devices for actuating said register, a traveling carriage, a toothed bar on said carriage, a decimal order selector adjustable to different positions on said toothed bar and arranged to select the decimal orders, and a series of decimal order devices in proximity to said selector to be directly engaged thereby at the carriage movements.

35. The combination of a set of number wheels, a step-by-step feeding carriage, a selector connected to said carriage to travel therewith, a set of denominational trains of mechanism extending from said number wheels to said selector to be engaged thereby, the movement of said selector being reverse with relation to the denominational order of said number wheels, and said trains of mechanism being transposed between said number wheels and said selector, and numeral key-controlled devices coöperating with said trains to compute upon said number wheels.

36. The combination with a step-by-step advancing carriage, of a set of number devices, a denomination-selecting dog traveling with said carriage, and a set of denominational trains of computing mechanism extending from said number devices and including members engageable and movable by said dog; the advance of said carriage being in the reverse order from the denominational order of said number devices, and the trains in said set being transposed between their ends.

37. The combination of a carriage which feeds step-by-step from right to left, a bank of computation wheels arranged in the natural denominational order, wheel-driving members, indexing mechanism including a set of trains of denominational members extending from said driving members to said carriage, and keys to control said carriage and coöperate with said indexing mechanism; a transposition device being included in said trains to reverse the denominational order thereof.

38. The combination with numeral keys and a carriage controlled thereby and advancing from right to left, of a computing mechanism for coöperation with said keys, and including a set of denominational-selecting trains, under the control of said carriage; the trains in said set being transposed between their ends.

39. The combination with numeral keys and a carriage controlled thereby and advancing from right to left, of a computing mechanism coöperating with said keys, and including a set of movable devices for selecting the denominations, said selecting devices having a transposed arrangement, so that the denominational order at one end of the set is the reverse of the order at the other end of the set, and means to enable said carriage to actuate said selecting devices.

40. The combination with numeral keys and a carriage controlled thereby and advancing from right to left, of a computing mechanism coöperating with said keys, and including a set of movable devices for selecting the denominations, said selecting devices having a transposed arrangement, so that the denominational order at one end of the set is the reverse of the order at the other end of the set, and means to enable said carriage to actuate said selecting devices; each of said selecting devices having a lug whereby it is moved, and also having a lug whereby it effects a selection.

41. The combination with a set of decimal order bars, a group of index-devices carried by said decimal order bars, and key-operated index-setters common to said bars, of means for selectively lifting or displacing the bars to bring any set of index-devices within range of the key-operated index-setters, a device for restoring the set index-devices to normal positions, and means connected to said index-restoring device for temporarily locking said bars against displacement.

42. The combination of a carriage, a selector-dog on said carriage, a series of pivoted jacks engageable selectively by said dog to be moved thereby, and key-controlled computing devices including denominational indexing-members displaceable by said jacks.

43. The combination of a carriage, a selector-dog on said carriage, a series of pivoted jacks engageable selectively by said dog to be moved thereby, key-controlled computing devices including denominational indexing-members, and order-reversing connections extending from said jacks to said indexing members to displace the latter.

44. The combination of a key mechanism, a group of indexing-devices settable by said key mechanism, a set of denominational members upon which said indexing-devices are carried, said indexing-devices being normally out of range of said key mechanism, a set of pivoted jacks connected to said denominational members to move the indexing-devices into range of the key mechanism, a carriage, and a selector-dog on said carriage to operate said jacks.

45. The combination of a key mechanism, a group of indexing-devices settable by said key mechanism, a set of denominational members upon which said indexing-devices are carried, said indexing-devices being normally out of range of said key mechanism, a set of pivoted jacks, order-reversing connections extending from said jacks to said denominational members to move the latter to bring the indexing-devices into range of the key mechanism, a carriage, and a selector-dog on said carriage to engage said jacks.

46. The combination of a key mechanism, a group of index-devices, a set of denominational members carrying said index-devices, means, including a set of levers, to move said denominational members to bring said index-devices within the range of said key mechanism, a set of jacks, links extending from said levers to said jacks, a carriage, and a selector-dog on said carriage to operate said jacks.

47. The combination of a key mechanism, a group of index-devices, a set of denominational members carrying said index-devices, levers to move said denominational members to bring said index-devices within the range of said key mechanism, a transposition mechanism between said levers and said denominational members, a set of jacks, links extending from said levers to said jacks, a carriage, and a selector-dog on said carriage to operate said jacks.

48. The combination with a typewriting machine, including a paper carriage and keys, of a selector-dog mounted on the carriage, jacks mounted on the machine frame to be selectively engaged by said dog, denominational bars operable by said jacks and extending forwardly beneath the typewriting machine, indexing-devices carried by said bars and movable thereby into position to be operated by setting devices controlled by the typewriter keys, number wheels operable by said bars, and means for driving said bars.

49. The combination with a typewriting machine, including a paper carriage mounted at the upper part of the machine, and also including keys, of a selector-dog mounted on the carriage, pivoted jacks mounted on the machine frame to be selectively engaged by said dog, links extending from said jacks down behind the typewriting machine to the base thereof, denominational bars operable by said links and extending forwardly beneath the typewriting machine, indexing-devices carried by said bars and movable thereby into position to be operated by setting devices controlled by the typewriter keys, and number wheels operable by said bars.

50. A computing mechanism combining computing wheels, driving means therefor, key-controlled indexing devices for controlling the extent of drive, a carriage, and a pair of coöperating denomination-selecting devices associated with said computing wheels, one mounted on the carriage and the other on the frame of the machine, said devices embodying a dog and a group of denominational trains in the path of said dog to be operated thereby during the advance of the carriage, said dog mounted for free movement past said trains upon the return movement of said carriage.

51. The combination with key-set indexing devices, of a key-controlled carriage, a denomination selector-dog adjustable along said carriage, and a set of movable jacks operable by said selector-dog during the advance of the carriage, and having denominational connections to said key-set indexing devices to displace the latter selectively, according to the position of the carriage.

52. The combination with key-set indexing devices, of a key-controlled carriage, a denomination selector-dog adjustable along said carriage, and a set of movable jacks operable by said selector-dog during the advance of the carriage, and having denominational connections to said key-set indexing devices to displace the latter selectively, according to the position of the carriage; means being provided to prevent the effective operation of said jacks by said dog during the retraction of the carriage.

53. The combination with a key-controlled paper carriage, of a denomination selector-dog adjustable along said carriage, a set of jacks movable by said selector-dog during the advance of the carriage, a set of digit wheels, and transposed trains of mechanism extending from said digit wheels to said jacks.

54. The combination with key-set indexing devices, of a key-controlled typewriter carriage, a selector-dog on said carriage, and a set of movable jacks operable by said selector-dog during the advance of the carriage, and having denominational connections to said key-set indexing devices to displace the latter selectively, according to the position of the carriage; means being provided to prevent the effective operation of said jacks by said dog during the retraction of the carriage.

55. In a combined typewriting and adding machine, the combination of typewriting mechanism, including numeral keys for writing numbers, and a carriage, and adding mechanism, including a denomination-determining mechanism, said denomination-determining mechanism including a succession of denominational members at letter-space intervals extending normally into the path of a tappet on said carriage, a relative movement being provided for between said tappet and the denomination-determining mechanism, so that the latter shall no longer be within range of the tappet, whereby at will the machine may be used for both writing and adding numbers, or writing without adding the numbers.

56. In a combined typewriting and adding machine, the combination of typewriting mechanism, including numeral keys for writing numbers, and a carriage, and adding mechanism, including a denomination-determining mechanism, said denomination-determining mechanism including a succession of denominational members at letter-space intervals extending normally into the path of a tappet on said carriage, said tappet being mounted for movement out of range of the denomination-determining mechanism.

57. A computing mechanism comprising the combination with key-set indexing devices, of a key-controlled typewriter carriage, a denomination selector-dog on said carriage, and a set of jacks engageable by said selector-dog and having denominational connections to said indexing devices.

58. The combination with key-set indexing devices, of a key-controlled typewriter carriage, a denomination selector-dog on said carriage, and a set of movable jacks operable successively by said selector-dog during the advance of the carriage, and having denominational connections to said key-set indexing devices to displace the latter selectively, according to the position of the carriage.

59. In a combined typewriter and computing machine, the combination with a register having decimal orders, of register actuating devices, a decimal order selector, lock devices for the register actuating devices, and connections between said lock devices and decimal order selector which prevent said selector's operative movement, when the register actuating means are not in normal position.

60. In a combined typewriter and computing machine, the combination with a register having decimal orders, of a decimal order selector, register actuating devices, a traveling paper supporting carriage, locking devices for the register actuating devices, and connections between said locking devices and said carriage which block the progress of the carriage in the direction of its operative movement, when the register actuating devices are not in normal position.

61. In a computing machine, the combination with parts in which numbers are temporarily set up, computing devices and a general operator for carrying the set up numbers into said computing devices, said parts being normally in ineffective position, of means for moving said parts to effective position to set up numbers thereon, and means for locking said parts on which numbers are set up against being in any other than normal position during return movement of said general operator.

FREDERICK A. HART.

Witnesses:
 ARTHUR A. JOHNSON,
 E. B. LIBBEY.

Copies of this patent may be obtained for five cents each, by addressing the "Commissioner of Patents, Washington, D. C."